(12) United States Patent
Rijskamp et al.

(10) Patent No.: US 10,485,372 B2
(45) Date of Patent: Nov. 26, 2019

(54) BEVERAGE MACHINE

(71) Applicant: KONINKLIJKE PHILIPS N.V., Eindhoven (NL)

(72) Inventors: Peter Rijskamp, Eindhoven (NL); Rodin Enne Bruinsma, Eindhoven (NL); Hendrikus Lodewijk Joseph Franciscus Holten, Eindhoven (NL); Mark Ronald Van Der Woning, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 120 days.

(21) Appl. No.: 15/104,676

(22) PCT Filed: Dec. 23, 2014

(86) PCT No.: PCT/EP2014/079170
§ 371 (c)(1),
(2) Date: Jun. 15, 2016

(87) PCT Pub. No.: WO2015/101557
PCT Pub. Date: Jul. 9, 2015

(65) Prior Publication Data
US 2016/0316958 A1 Nov. 3, 2016

(30) Foreign Application Priority Data
Dec. 31, 2013 (EP) .................................... 13199864

(51) Int. Cl.
*A47J 31/44* (2006.01)
*A47J 31/06* (2006.01)
(Continued)

(52) U.S. Cl.
CPC ....... *A47J 31/0673* (2013.01); *A47J 31/0631* (2013.01); *A47J 31/0668* (2013.01);
(Continued)

(58) Field of Classification Search
CPC ................ A47J 31/0631; A47J 31/0668; A47J 31/0652; A47J 31/4478
(Continued)

(56) References Cited

U.S. PATENT DOCUMENTS 4,253,385 A * 3/1981 Illy ..................... A47J 31/3685
99/281
6,244,162 B1 * 6/2001 Dahmen ............. A47J 31/4478
426/433
(Continued)

FOREIGN PATENT DOCUMENTS

CA 2562446 * 4/2007
CN 1886077 A 12/2006
(Continued)

OTHER PUBLICATIONS

Office Action issued in connection with corresponding 2016-541149, dated Jan. 13, 2017, 4 pages.
(Continued)

*Primary Examiner* — Reginald Alexander
(74) *Attorney, Agent, or Firm* — Schott, P.C.

(57) ABSTRACT

The present invention relates to a beverage machine. The beverage machine comprises a brewing unit (10) with (i) a main body (12) defining a hollow (14) for receiving a portable capsule holder (18) and (ii) a lid (20) connected to the main body (12) for opening and closing the hollow (14). The beverage machine comprises a portable capsule holder (18) that is configured to receive a capsule (50) which encapsulates an extractable food product. The brewing unit (10) and the portable capsule holder (18) cooperate together in a manner that is regarding the liquid flow similar as a fountain.

19 Claims, 5 Drawing Sheets

(51) Int. Cl.
*A47J 31/36* (2006.01)
*A47J 31/40* (2006.01)

(52) U.S. Cl.
CPC ......... *A47J 31/369* (2013.01); *A47J 31/3685* (2013.01); *A47J 31/3695* (2013.01); *A47J 31/407* (2013.01); *A47J 31/4478* (2013.01); *A47J 31/0652* (2013.01)

(58) Field of Classification Search
USPC .......................................... 99/323, 295, 315
See application file for complete search history.

(56) References Cited

U.S. PATENT DOCUMENTS

| | | | | |
|---|---|---|---|---|
| 6,513,419 | B2* | 2/2003 | Huber | A47J 31/4478 426/433 |
| 2005/0103202 | A1* | 5/2005 | Rahn | A47J 31/0631 99/279 |
| 2006/0225576 | A1 | 10/2006 | D'Hont | |
| 2007/0169640 | A1 | 7/2007 | Sato | |
| 2008/0173180 | A1* | 7/2008 | Boerner | A47J 31/0668 99/279 |
| 2013/0133522 | A1 | 5/2013 | Denisart | |

FOREIGN PATENT DOCUMENTS

| | | | |
|---|---|---|---|
| CN | 1957815 | A | 5/2007 |
| CN | 101115422 | A | 1/2008 |
| CN | 201481108 | U | 5/2010 |
| DE | 1454162 | * | 11/1968 |
| DE | 1454160 | * | 5/1970 |
| DE | 202004012327 | U1 | 11/2004 |
| EP | 1308115 | A1 | 5/2003 |
| EP | 1774880 | A1 | 4/2007 |
| EP | 2401945 | A1 | 1/2012 |
| EP | 2510803 | A2 | 10/2012 |
| JP | 2007-502640 | A | 2/2007 |
| JP | 2007-105469 | A | 4/2007 |
| JP | 2008-528172 | A | 7/2008 |
| WO | 2009022364 | A2 | 2/2009 |
| WO | 2012123003 | A1 | 9/2012 |
| WO | 2013079814 | A1 | 6/2013 |

OTHER PUBLICATIONS

Notice of Allowance issued in connection with corresponding 2016-541149, dated Apr. 28, 2017, 5 pages.
Office Action issued in connection with corresponding 201480071802.X, dated Jul. 3, 2018, 8 pages.
Office Action issued in connection with corresponding 2014375282, dated Oct. 1, 2018, 2 pages.

* cited by examiner

US 10,485,372 B2

BEVERAGE MACHINE

This application is the U.S. National Phase application under 35 U.S.C. § 371 of International Application No. PCT/EP2014/079170, filed on Dec. 23, 2014, which claims the benefit of International Application No. 13199864.3 filed on Dec. 31, 2013. These applications are hereby incorporated by reference herein.

FIELD OF THE INVENTION

The present invention relates to a beverage machine, such as e.g. a coffee and/or espresso coffee machine. The present invention particularly relates to a single-serve automatic or semi-automatic coffee and/or espresso coffee machine. Further, the present invention relates to a brewing unit and to a portable capsule holder for the beverage machine.

BACKGROUND OF THE INVENTION

Automatic or semi-automatic single-serve coffee and/or espresso coffee machines become more and more popular. The main advantages of these single-serve coffee machines are, compared to fully automatic coffee machines (bean to cup coffee machines), their reduced complexity as well as their more hygienic usage. Due to their reduced complexity compared to fully automatic coffee machines, such single-serve coffee machines may be offered to the consumer at comparatively affordable prices. Single-serve coffee machines are also easy in handling for the consumer. Furthermore, both the time needed to brew coffee is reduced and the brewing process is simplified by eliminating the need to measure out portions, flavourings, and additives from large bulk containers.

Single-serve coffee machines rely on the basic principle to extract the coffee from grinded coffee or coffee powder that is encapsulated within a pad or capsule. These pads or capsules are inserted into a sealed brewing chamber of a brewing unit of the machine. After that, hot or cold water is injected or diffused into the brewing chamber and into the pad or capsule, so that coffee may be extracted therefrom. The used pads or capsules may then be thrown away. Depending on the ingredients enclosed within the pads or capsules, different types of coffee and/or espresso coffee recipes and flavours may be dispensed. It is even possible to extract tea, hot chocolate, soups or other types of hot or cold beverages with these types of single-serve machines. Therefore, these machines are herein generally denoted as beverage machines.

An example of such a machine is sold by the applicant under the name Senseo. This type of machine uses soft pads in which the extractable food product is enclosed. These soft pads are sometimes also denoted as pods.

However, other suppliers of single-serve coffee machines make use of differently shaped or sized coffee pads or differently shaped and sized capsules. These differently sized and shaped pads and capsules do not only require different receptacles within the coffee machine that are exclusively adapted to the shape and size of the specific pad or capsule. The different machine types also differ from a technical point of view. Machines using capsules usually use higher pressures (around 5 to 19 bar) than machines using the bigger and softer pads, like the Senseo machine which uses pressures of around 1.2 to 1.9 bar. The technical design of the brewing unit therefore differs for these different machine types significantly.

When someone would like to use different types of pads or capsules, different types of appliances are needed. This would mean different machines each with its specific way of working and consuming space in the kitchen.

WO 2013/079814 A1 and US 2013/0133522 A1 refer to single-serve coffee machines that allow using differently sized and shaped pads and capsules. Comparatively complicated adapters are used therein, one for each different type of pad or capsule. These adapters are relatively uncomfortable in handling. The adapters usually comprise a plurality of different parts that have to be assembled together in a correct manner by the consumer each time a new capsule or pad is inserted into one of the different adapters. Apart from that, a correctly balanced force distribution within the brewing unit and a proper sealing of the brewing chamber is still hard to guarantee.

A further problem that arises for combined pad and capsule machines is the fact that the liquid flow behaves fairly different in a pad than in a capsule. Capsules usually comprise a plastic or metallic main body that is covered at its top with a thin foil. It has been shown that the flow behaviour and the resulting coffee quality is improved if the liquid is injected into the capsule at its bottom side and leaves the capsule at its top through the foil. For combined pad and capsule machines, where the liquid is usually injected into the brewing chamber from the top, this would however mean that the capsule has to be inserted into the brewing unit upside-down. Even though this is technically feasible, it is less intuitive for the consumer to insert the capsule upside-down.

Thus, there is still room for improvement.

SUMMARY OF THE INVENTION

It is an object of the present invention to provide of the present invention to provide an improved single-serve beverage machine that may be used with different kinds of pads and capsules. It is particularly an object of the present invention to provide a technical solution for a brewing unit and a portable capsule holder that enables a more intuitive handling.

In a first aspect of the present invention, a beverage machine is presented that comprises:

a brewing unit with (i) a main body defining a hollow for receiving a portable capsule holder and (ii) a lid connected to the main body for opening and closing the hollow; and the portable capsule holder that is configured to receive a capsule which encapsulates an extractable food product;

wherein the lid comprises a liquid feeding channel which runs through the lid and ends in a first liquid outlet arranged at a bottom side of the lid, and wherein the lid further comprises a liquid transport channel which starts at a liquid inlet arranged at the bottom side of the lid, runs internally through the lid, and ends in a second liquid outlet arranged at the bottom side of the lid;

wherein the portable capsule holder comprises:

a substantially cup-shaped base body with a capsule receptacle for receiving the capsule, wherein the capsule receptacle is defined by (i) a bottom wall that is arranged on a bottom side of the base body and by (ii) at least one side wall which surrounds the capsule receptacle and runs transverse to the bottom wall, wherein the capsule is insertable into the capsule receptacle through an opening which is arranged on a upper side of the base body opposite the bottom side; and at least one internal holder channel which is integrated into the at least one side wall, wherein the internal holder channel starts at a holder liquid inlet arranged at the upper side of the base body, runs internally through the at least one the side wall, and ends in an inner face of the capsule receptacle, wherein the inner face faces the capsule when the capsule is inserted.

In a second aspect of the present invention, a brewing unit for the beverage machine is presented that comprises:

a main body defining a hollow for receiving a portable capsule holder and (ii) a lid connected to the main body for opening and closing the hollow;

wherein the lid comprises a liquid feeding channel which runs through the lid and ends in a first liquid outlet arranged at a bottom side of the lid, and wherein the lid further comprises a liquid transport channel which starts at a liquid inlet arranged at the bottom side of the lid, runs internally through the lid, and ends in a second liquid outlet arranged at the bottom side of the lid.

In a third aspect of the present invention, a portable capsule holder for the beverage machine is presented that comprises:

a base body which is substantially cup-shaped and comprises a capsule receptacle for receiving a capsule that encapsulates an extractable food product, wherein the capsule receptacle is defined by (i) a bottom wall that is arranged on a bottom side of the base body and by (ii) at least one side wall which surrounds the capsule receptacle and runs transverse to the bottom wall, wherein the capsule is insertable into the capsule receptacle through an opening which is arranged on a upper side of the base body opposite the bottom side; and at least one internal holder channel which is integrated into the at least one side wall, wherein the internal holder channel starts at a holder liquid inlet arranged at the upper side of the base body, runs internally through the at least one the side wall, and ends in an inner face of the receptacle which inner face faces the capsule when the capsule is inserted.

Preferred embodiments of the invention are defined in the dependent claims. It shall be understood that the claimed brewing unit and the claimed portable capsule holder have similar and/or identical preferred embodiments as the claimed beverage machine, and as defined in the dependent claims.

The presented beverage machine may be particularly realized as a coffee and/or espresso coffee machine. In a preferred embodiment the beverage machine further comprises a portable pad holder that is configured to receive a soft pad which encapsulates an extractable food product, wherein the hollow is configured to selectively receive either the portable capsule holder or the portable pad holder. The portable pad holder is preferably a separate part. In this way the beverage machine may be used either with soft pads or with capsules. If the consumer decides to use a soft pad, he/she may insert the portable pad holder into the hollow of the brewing unit. If the user decides to use a capsule, he/she may insert the portable capsule holder into the hollow of the brewing unit. This guarantees and easy handling for the consumer.

In practice, the invention may, for example, be applied in a Senseo machine that is modified in such a way, that not only soft pads may be used within it, but also capsules. Due to the different concepts of such pads and capsules, this enables to brew different types of "regular" coffees and espresso coffees with one and the same machine. In general it may be stated that soft pads are more suitable for brewing "regular" coffee, while capsules are more suitable for brewing espresso coffee.

The main improvement of the presented machine, however, refers to the way the brewing unit and the portable capsule holder are constructed. The herein presented construction of the brewing unit and the portable capsule holder enables to use a brewing unit where the liquid is injected from the top of the brewing unit as in "regular" single-serve pad machines, while it is not necessary to place the capsule in the portable capsule holder in an upside-down manner. The capsule may still be placed in the capsule holder such that the top of the capsule that is covered with a foil still faces upwardly towards the top of the brewing unit, i.e. towards the backside of the lid of the brewing unit. This makes it more intuitive for the consumer to place the capsule correctly in the portable capsule holder as well as it makes it more intuitive for the consumer to correctly place the capsule holder together with the capsule into the brewing unit.

This is guaranteed by a special channel system that is integrated within the lid of the brewing unit and within the portable capsule holder. One characteristic feature of the brewing unit of the machine is that the liquid used for brewing the hot beverage flows twice through the lid. The liquid is injected into the brewing unit via the liquid feeding channel that runs internally through the lid and ends in the first liquid outlet that is arranged at the bottom side of the lid. It is to be noted that the bottom side of the lid denotes the side of the lid that faces the hollow when the lid is closed. The liquid then enters the portable capsule holder, flows through the capsule and enters the lid again via the liquid inlet that is also arranged at the bottom side of the lid. When entering the liquid inlet the liquid has thus already passed the capsule, so that the liquid entering the liquid inlet already comprises the produced beverage that is extracted from the extractable food product encapsulated in the capsule. The hot beverage then flows from the liquid inlet again internally through the lid in the herein called liquid transport channel and leaves the liquid transport channel through the second liquid outlet.

Regarding the coffee production this means that hot water first flows through the lid in the liquid feeding channel, leaves the lid, flows through the portable capsule holder and the capsule, where the coffee is extracted. The coffee then re-enters the lid, flows through the liquid transport channel and finally leaves the lid through the second liquid outlet.

A further central feature of the presented beverage machine is the way the liquid flows through the portable capsule holder. The first liquid outlet, where the liquid leaves the lid the first time, is configured to be connected to the holder liquid inlet when the portable capsule holder is inserted into the brewing unit and the lid is closed. In contrast to single-serve coffee machines of the prior art, the liquid will then not directly enter the capsule, but first flow internally through the capsule holder. The liquid flows from the first liquid outlet to the holder liquid inlet, then via an internally holder channel through the sidewall of the capsule holder and leaves the sidewall of the capsule holder at the inner face of the capsule receptacle. From there it flows along the outer periphery of the capsule towards the bottom wall, and enters the capsule at its bottom side. The liquid then flows through the capsule from its bottom to its top, thereby extracts the extractable food product (e.g. coffee) encapsulated in the capsule, and leaves the capsule at its top side.

Even though the above-explained liquid path might appear complicated at first sight, it presents an effective way of realizing a single-serve beverage machine, where the capsules used for the beverage production may be inserted into the brewing unit in a natural way (not upside-down) and where the liquid still flows from the bottom to the top of the capsule, which is regarding the fluid dynamics considered to be optimal for brewing coffee and/or espresso coffee.

According to a refinement, the liquid feeding channel and the liquid transport channel preferably run substantially parallel to the bottom side of the lid. Parts of the liquid feeding channel may still run transverse or even perpendicular to the bottom side of the liquid. Nevertheless, if most parts of the liquid feeding channel and the liquid transport channel run substantially parallel to the bottom side of the lid, the size, especially the height of the lid, can be kept comparatively small.

According to a further refinement, the main body of the brewing unit comprises a liquid collection bowl, wherein the liquid collection bowl comprises a liquid dispensing outlet for dispensing a hot beverage brewed within the brewing unit. The second liquid outlet opens into the liquid collection bowl when the portable capsule holder is inserted into the liquid collection bowl and the lid is closed.

The liquid collection bowl thus functions as a collector for the extracted hot beverage. It is herein also denoted as coffee collector. The liquid collection bowl surrounds the capsule holder, so that the extracted hot beverage that leaves the lid through the second liquid outlet may drizzle into the liquid collection bowl, and may be finally dispensed through the liquid dispensing outlet into the cup of the consumer placed underneath. The liquid dispensing outlet is therefore preferably arranged at the bottom side of the liquid collection bowl. The liquid collection bowl also defines the hollow or receptacle into which the portable capsule holder may be placed. This receptacle is configured in such a way that the portable pad holder may be inserted into it as well if the user wants to use pads instead of capsules.

The liquid collection bowl may be, but does not have to be fixed in the main body of the brewing unit. It may also be designed as a replaceable part. This facilitates the cleanability.

According to a further refinement, the lid comprises a plurality of liquid feeding channels, wherein each of the plurality of liquid feeding channels runs through the lid and ends in a separate first liquid outlet arranged at the bottom side of the lid. Each of the plurality of liquid feeding channels preferably starts in a central area of the lid and runs radially outward to the respective first liquid outlet. The first liquid outlets are thereby preferably equally distanced from the central area.

The liquid is thus injected into the brewing unit not only through a single liquid outlet (first liquid outlet), but will be distributed over several liquid outlets. This enables an even better liquid distribution within the brewing unit which is advantageous for both configurations, i.e. when the capsule holder is used as well as when the pad holder is used.

According to further a embodiment, the lid further comprises a first puncture element for puncturing an upper side of the capsule, wherein the first puncture element is arranged at the bottom side of the lid and fluidly connected to the liquid inlet of the lid.

The liquid inlet of the lid, where the extracted hot beverage enters the lid the second time, may be exemplarily integrated into the first puncture element. As explained above, the bottom side where the first puncture element is arranged on the lid is the side that faces the top side of the capsule when the lid is closed. The top side of the capsule, which is usually covered by a thin foil, will thus be automatically punctured and partly destroyed as soon as the lid is closed. The first puncture element will pierce or punch one or more smaller holes into the foil of the capsule, so that the extracted hot beverage may leave the capsule and enter the lid via the liquid inlet again.

However, the above-mentioned first puncture element is only an alternative, but not a mandatory feature. Preferably, capsules are used which have a pre-perforated foil covering the top side of the capsule. In this case the foil does not have to be punctured or pierced, since the liquid may seep through the pre-perforated holes in the foil. There are also other types of capsules which do not have to be actively punctured or pierced, even though they do not have a pre-perforated foil. The latter-mentioned type of capsules usually have a foil covering the top side of the capsule, wherein the foil is destroyed by the internal pressure as soon as pressurized liquid is injected into the capsule.

In a further refinement, the portable capsule holder comprises a plurality of internal holder channels, wherein each internal holder channel is integrated into the at least one sidewall, starts at a holder liquid inlet arranged at the upper side of the base body, runs internally through the at least one sidewall, and ends in the inner face of the capsule receptacle.

In correspondence to the first liquid outlets, the plurality of internal holder channels are preferably also equally distanced from a central longitudinal axis of the capsule receptacle. The holder liquid inlets are thus also locally distributed over the periphery of the upper side of the base body. Each first liquid outlet of the lid is then connected to a respective one of the holder liquid inlets when the lid is closed. By having a plurality of internal holder channels, the liquid will thus enter the capsule receptacle from different sides which is regarding both the fluid-dynamical behavior as well as the thermo-dynamical behavior considered to be advantageous. The liquid flow through the capsule holder and the capsule in this case resembles a fountain.

According to a further refinement, the base body of the portable capsule holder comprises at least two separate body parts, a first body part and a second body part, that are moveable relative to each other, and wherein a sealing element is arranged between the first and the second body part.

Additionally, a spring element may be arranged between the first and the second body part. The spring element functions as an expansion element that forces the two body parts away from each other up to a predefined mechanical bed stop. The spring element may also comprise a plurality of separate spring elements. This has the main advantage that sealing between the brewing unit and the capsule holder is improved, since the base body of the capsule holder will be slightly compressed when the lid of the brewing unit is closed, so that an initial force is applied that is sufficient enough to provide an initial sealing. This prevents the injected liquid to leak through the contact surfaces.

The sealing element that is arranged between the two body parts of the portable capsule holder acts as a kind of pressure compensator. As soon as liquid is injected into the capsule, the pressure within the portable capsule holder will significantly increase. The two parts of the base body of the capsule holder will thus slightly move apart from each other. The mentioned sealing element then compensates the movement of the first body part relative to the second body part, such that the sealing is maintained.

According to a further refinement, the at least one sidewall of the portable capsule holder comprises a flange receptacle for receiving a flange of the capsule, wherein the flange receptacle is recessed in the at least one sidewall and arranged on the upper side of the base body.

This refinement provides a better sealing between the lid, the capsule and the capsule holder. Apart from that, the capsule is thereby mechanically fixed in the capsule holder. This provides an easier handling for the consumer as it enables the consumer to place the capsule in the capsule holder intuitively in the correct manner.

In a further refinement, the portable capsule holder comprises a valve which is connected to the bottom wall. This valve allows draining the portable capsule holder after the brewing process when no pressure is applied.

In a further embodiment, the portable capsule holder comprises a second puncture element for puncturing a rear side of the capsule, wherein said second puncture element projects from the inner face of the capsule receptacle and is connected to the bottom wall.

This second puncture element pierces or punches one or more holes into the rear side of the capsule either when the capsule is inserted into the portable capsule holder or when the lid of the brewing unit is closed and the capsule is pressed down within the capsule holder.

However, the second puncture element is—similar as the above-mentioned first puncture element—only an alternative, but not a mandatory feature. Preferably, capsules are used which have at least one pre-perforated opening in the bottom side of the capsule. In this case the bottom side of the capsule does not have to be punctured or pierced, since the liquid may be injected into the capsule through the pre-perforated openings.

The liquid that enters the capsule receptacle through the internal holder channel (as explained above) will thus flow along the inner face of the holder's sidewalls towards the bottom wall and enter there the capsule through the one or more openings that were either pre-perforated or actively pierced into the capsule by means of the second puncture element. In order to guarantee that the liquid may flow peripherally around the capsule, it is preferred that the inner diameter of the capsule receptacle is designed to be (slightly) larger than the outer diameter of the capsule. In this way a small gap is created between the outer periphery of the capsule and the inner face of the capsule receptacle. This also has a further advantage. Hot liquid flowing through this gap before entering the capsule will already heat up the capsule from outside.

While the foregoing paragraphs mainly focused on the design of the lid of the brewing unit and the design of the portable capsule holder, it should be clear that the beverage machine commonly also comprises a liquid supply for supplying liquid via the lid to the brewing unit, a heater for heating the liquid before being applied to the brewing unit as well as a controller for controlling the liquid supply and/or the heater. Depending on the desired recipe, the controller may specifically control the amount of liquid, the liquid flow rate and/or the heating power of the heater.

According to a further embodiment, the beverage machine may additionally comprise a detector for detecting which type of portable holder, the portable capsule holder or the portable pad holder, is inserted into the hollow. In this case, the controller may be configured to change the parameters of the liquid supply and/or the heater depending on the detected type of holder.

Since the pad holder is designed to be larger than the capsule holder, the pressure and the flow behavior will anyhow automatically depend on the type of holder that is inserted into the brewing unit. However, a controller that actively changes the pressure and/or the liquid flow rate depending on the type of inserted holder may even improve the coffee quality, since the liquid parameters are then even more accurately adapted to the type of consumable (capsule or pad) under use. For example, if a "regular" coffee shall be brewed and the pad holder including a soft pad is inserted, the controller may control the liquid supply to supply a larger amount of liquid at a higher flow rate. If an espresso coffee shall be brewed and the capsule holder including a capsule is inserted into the machine, the controller may control the liquid supply to supply a smaller amount of liquid at a lower flow rate, but with higher pressures.

The detector for detecting the type of holder that is inserted into the machine may be realized in a plurality of ways, e.g. as an optical, inductive or mechanical controller. The easiest way would be to include a small push-button that is only activated if one of the two different holder types is inserted.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1:
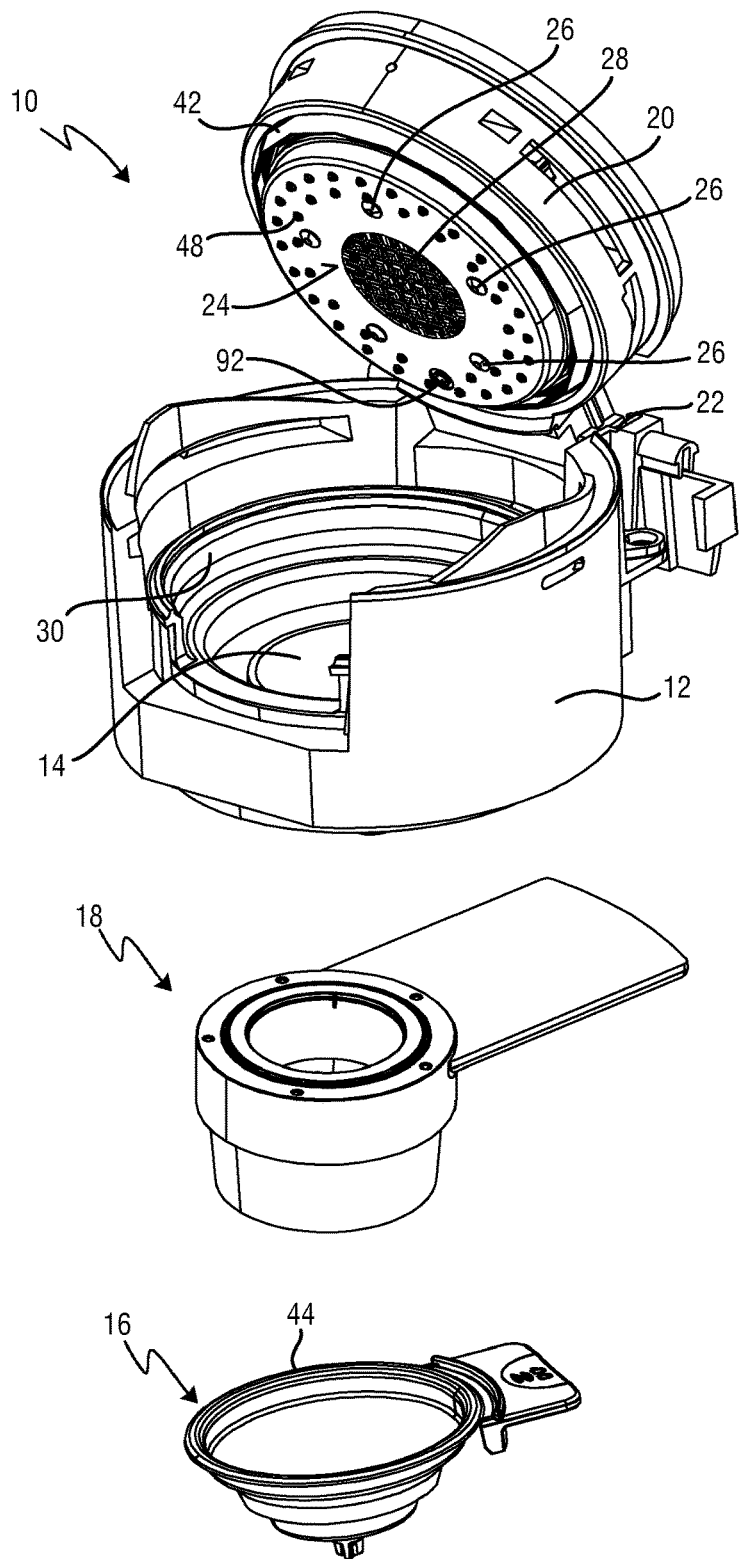
FIG. 1 shows a perspective view of a brewing unit, a portable capsule holder and a portable pad holder of the beverage machine according to an embodiment of the present invention.

FIG. 1 shows an embodiment of a brewing unit 10 of a beverage machine. The brewing unit 10 may be particularly used in a single-serve coffee and/or espresso coffee machine that allows to extract coffee and/or espresso coffee either from soft pads or from capsules. The remaining parts that are usually comprised in such a single-serve coffee and/or espresso coffee machine are for simplicity reasons not shown. In addition to the brewing unit 10, such single-serve coffee and/or espresso coffee machines usually comprise a liquid tank, a liquid supply including one or more pumps for supplying the liquid to the brewing unit 10, a heater for heating the liquid before supplying it to the brewing unit 10, as well as one or more controllers for controlling the liquid supply and/or the heater. Of course, the machine may also comprise several heaters that may be arranged either in parallel or in series.

However, since the focus of the present invention is on the brewing unit 10 as well as on the pad and capsule holders that may be inserted into the brewing unit 10, the figures explained in the following mainly refer to these essential features.

FIG. 1 shows in the upper part an embodiment of the brewing unit 10 according to the present invention. This brewing unit 10 comprises a main body 12 which forms the lower part of the brewing unit 10. The interior of the main body 12 comprises a hollow 14 for receiving different types of pad or capsule holders 16, 18. An embodiment of a portable pad holder 16 and a portable capsule holder 18 is shown in the lower part of FIG. 1. The pad holder 16 is designed for pads (e.g. soft pads) in which the extractable food product (e.g. ground coffee powder) is embedded. The capsule holder 18 is designed for capsules that encapsulate the extractable food product in a capsule.

The design of the hollow 14 and the portable holder 16, 18 is chosen such that both holders, the pad holder 16 and the capsule holder 18, may be selectively inserted into the brewing unit 10 without any additional adapter. This makes it possible to use one and the same single-serve coffee and/or espresso coffee machine with soft pads as well as with capsules.

The brewing unit further comprises a lid 20 that is connected to the main body 12 via a hinge 22. The lid 20 thus allows opening and closing the hollow 14. When the lid 20 is open (as shown in FIG. 1), one of the portable holders 16, 18 may be placed in the hollow 14. The hollow 14 is therefore herein also denoted as holder receptacle 14. When the lid 20 is closed (as shown in FIGS. 2 and 3), the lid 20 seals the hollow 14 to the exterior, such that the beverage (e.g. coffee and/or espresso coffee) may be brewed.

On the bottom side 24 of the lid 20, a plurality of liquid outlets 26 is arranged. These liquid outlets are herein denoted as first liquid outlets 26. The first liquid outlets 26 are fluidly connected with the liquid supply via one or more channels that are integrated in the lid 20. The first liquid outlets 26 serve for injecting the liquid, preferably hot water, into the interior of the brewing unit 10 as soon as the lid 20 is closed and the brewing process is started. It would be generally conceivable to provide only one of these first liquid outlets 26. However, having a plurality of first liquid outlets 26 is from a fluid-dynamical point of view more advantageous.

The lid 20 may further comprises one or more puncture elements which may be arranged at the bottom side 24 of the lid 20 where reference numeral 28 point to. These puncture elements are herein denoted as "first puncture elements" in order to differentiate them from a second type of puncture element that will be explained further below. The first puncture elements may serve for puncturing an upper side of a capsule that is inserted into the portable capsule holder 18. This will be explained in more detail further below with reference to FIGS. 3A and 3B.

Figure 2A:
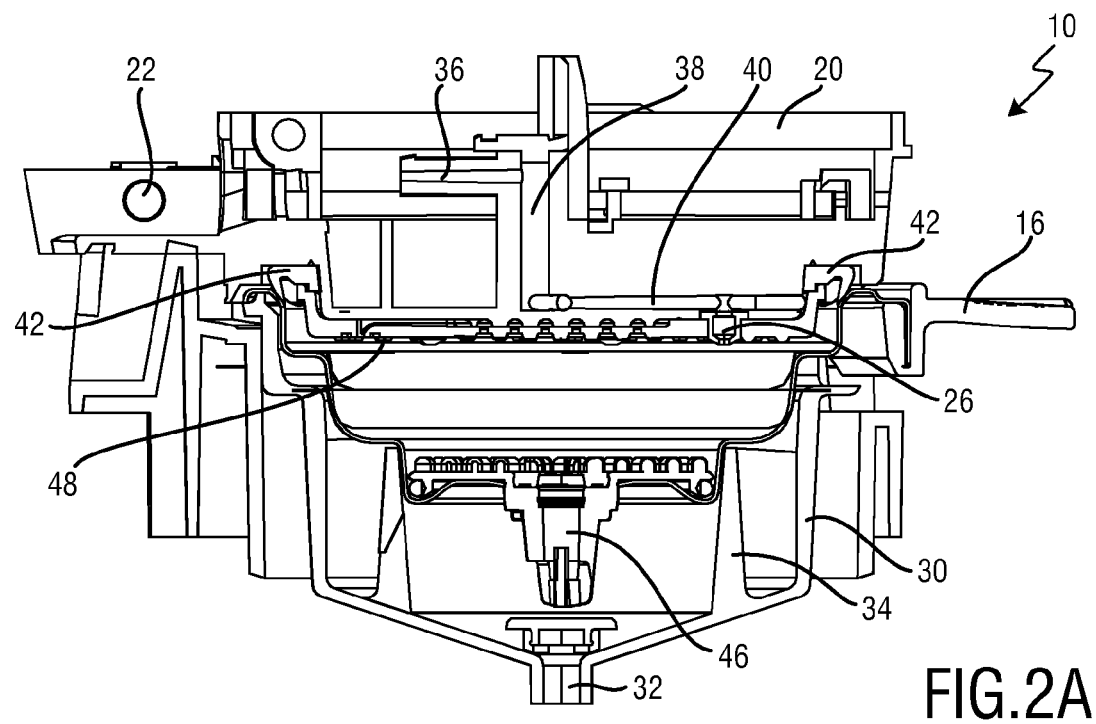
FIGS. 2A and 2B show a cross-section of the brewing unit, wherein the portable pad holder is inserted into the brewing unit.
Figure 2B:
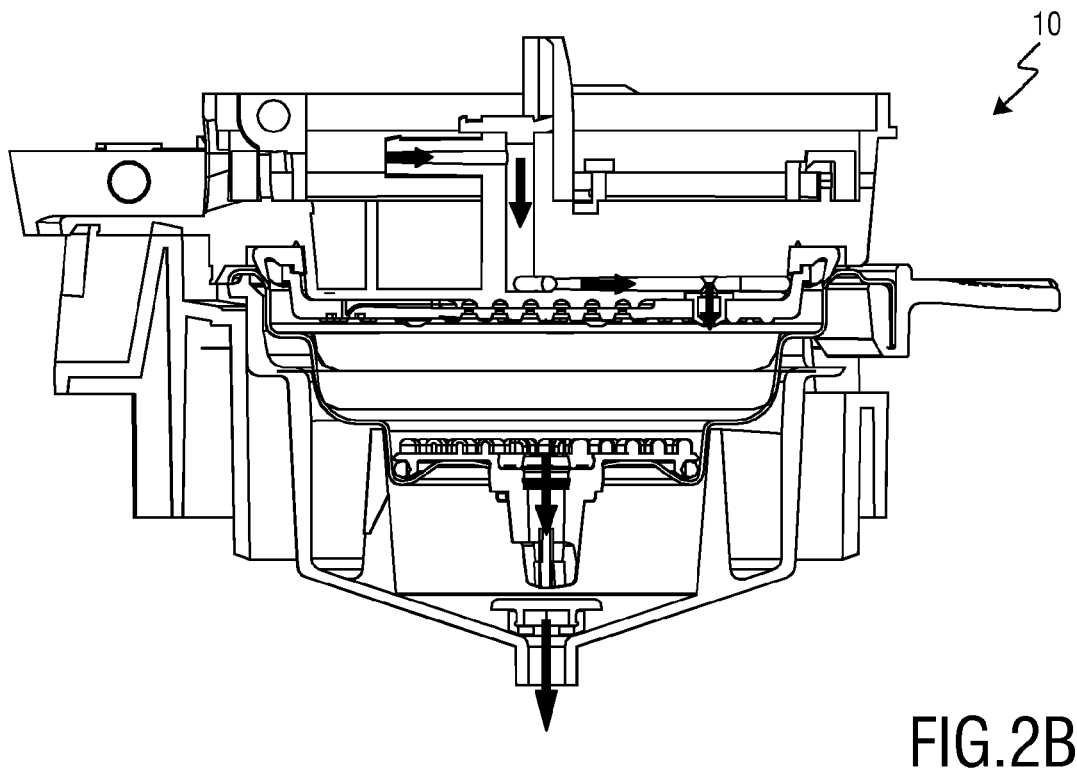

FIG. 2 shows a cross-section of the brewing unit 10, wherein the portable pad holder 16 is inserted into the hollow 14. FIGS. 2A and 2B show the same cross-section. For a better overview, the different parts of the brewing unit 10 and the portable pad holder 16 are referenced by means of reference numerals in FIG. 2A, while FIG. 2B illustrates how the liquid flows through the brewing unit 10 and the pad holder 16.

As it can be seen from FIG. 2A, the hollow 14 is according to this embodiment defined by a liquid collection bowl 30. This liquid collection bowl 30 comprises a liquid dispensing outlet 32 which is arranged at the bottom side of the liquid collection bowl 30. The liquid collection bowl 30 has two functions: On the one hand, it collects the brewed beverage after it passed the pad holder 16 and flew through the pad within the pad holder 16. The collected hot beverage then leaves the brewing unit 10 via the liquid dispensing outlet 32 directly into the cup of the consumer. On the other hand, the liquid collection bowl 30 serves as a receptacle for the pad holder 16. The liquid collection bowl 30 thereto comprises an integrated holder receptacle 34 into which the pad holder 16 may be inserted.

The liquid collection bowl 30 may be designed as an integrated part of the brewing unit 10. However, in the shown embodiment the liquid collection bowl 30 is designed as a replaceable part, such that the consumer may remove the liquid collection bowl 30 in order to clean it.

Figure 4:
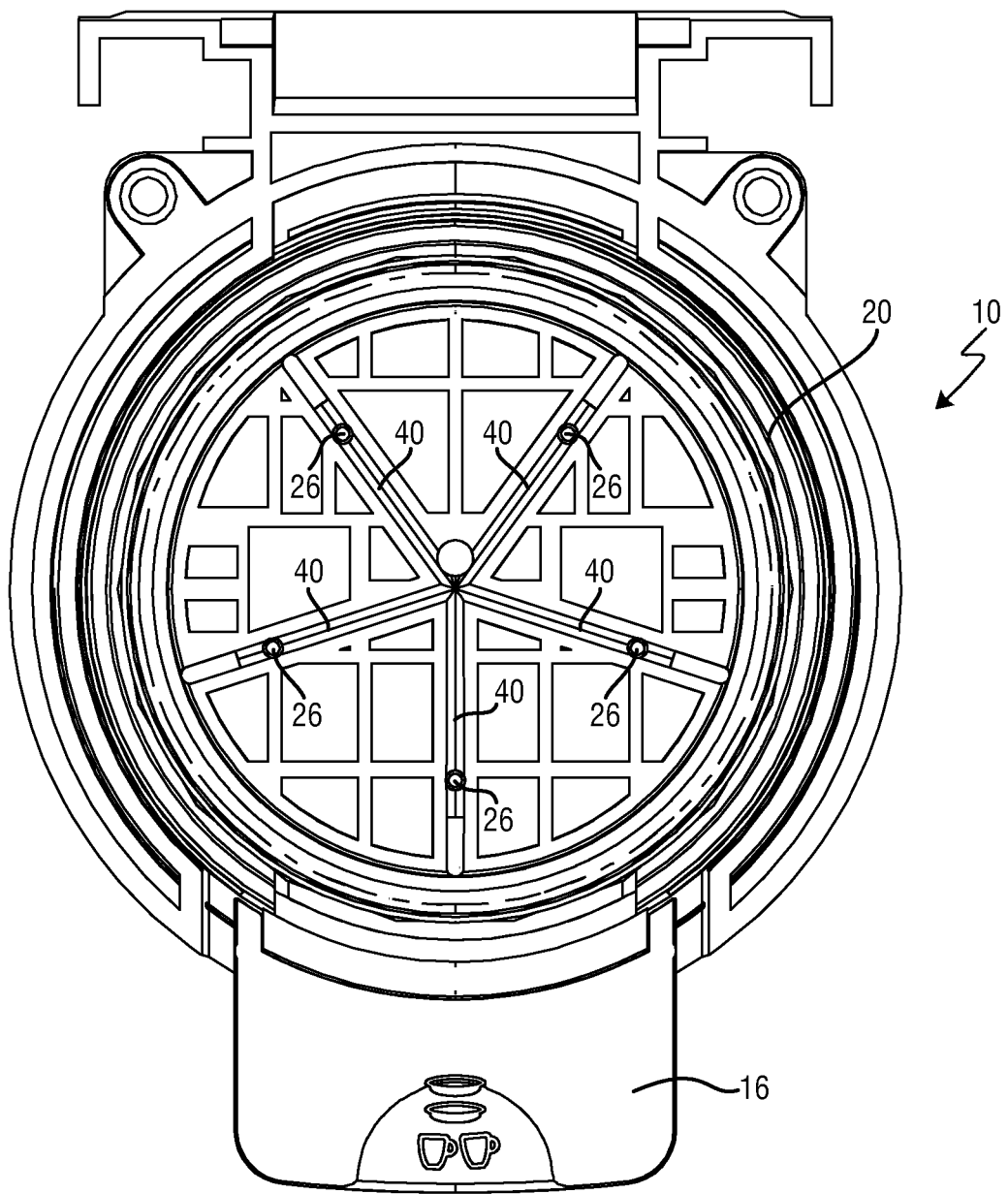
FIG. 4 shows a cross-section of a lid of the brewing unit according to an embodiment of the present invention.

FIG. 2A furthermore shows a channel system through which the liquid enters the interior of the brewing unit 10. This channel system is integrated into the lid 20. The channel system comprises a liquid supply inlet 36 which is connected to the liquid supply. This liquid supply inlet 36 leads into a liquid distribution channel 38 that is arranged transverse (preferably perpendicular) to the bottom side 24 of the lid 20 and located in a central area of the lid 20. The liquid distribution channel 38 leads into a plurality of liquid feeding channels 40. The cross-section shown in FIG. 2A only shows 1 liquid feeding channel 40. However, as it can be seen in FIG. 4, the lid 20 preferably comprises a plurality of the liquid feeding channels 40. FIG. 4 shows a cross-section of the lid 20, i.e. a cross-section parallel to the top side of the lid 20 at the position where the liquid distribution channel 38 opens into the liquid feeding channels 40. Each liquid feeding channel 40 connects the liquid distribution channel 38 to a respective one of the plurality of first liquid outlets 26. As shown in FIG. 4, each liquid feeding channel 40 starts in the central area of the lid 20 and runs radially outward towards a respective first liquid outlet 26.

The lid 20 furthermore comprises a sealing member 42 (see e.g. FIG. 2A). The sealing member 42 is integrated into the lid 20 and arranged at its bottom side 24 that faces the hollow 14 (the interior of the brewing unit 10) when the lid 20 is closed. This sealing member 42 is used for sealing the hollow 14 of the brewing unit 10 to the exterior. It is realized as a circular sealing ring (see e.g. FIG. 1) that engages an upper flange 44 of the portable pad holder 16 when the lid 20 is closed (as shown in FIG. 2A).

The lid 20 further comprises a plurality of protrusions 48 which are arranged on the bottom side 24. The protrusions 48 have the shape of small nipples (see e.g. FIG. 1). These nipples serve as distance elements in order to distance the soft pads from the bottom side 24 of the lid 20 when the brewing unit 10 is closed and the soft pads that are used for brewing coffee are inserted into the pad holder 16. If, on the other hand, capsules are used and the portable capsule holder 18 is inserted into the brewing unit 10, these nipples 48 do not have a specific function. They are mainly important to prevent the soft pads from sticking to the bottom side 24 of the lid 20 when the lid 20 is opened after the coffee brewing process. In case of a completely flat bottom side 24 of the lid 20, such pads would otherwise tend to stick to the lid 20, which makes the handling of the used pads uncomfortable for the consumer.

The liquid flow through the brewing unit 10 is schematically illustrated in FIG. 2B by means of arrows. As it becomes apparent from FIG. 2B, the liquid enters the lid 20 via the liquid supply inlet 36, flows into the liquid distribution channel 38, and is then distributed into the different liquid feeding channels 40. The hot liquid then leaves the lid 20 via the plurality of first liquid outlets 26 and enters the pad holder 16. By flowing through the pad (not shown), which is inserted into the pad holder 16, the beverage is extracted from the extractable food product embedded in the pad. The extracted hot beverage then leaves the pad holder 16 through a pad holder outlet 46, drizzles into the liquid collection bowl 30, and finally leaves the brewing unit 10 via the liquid dispensing outlet 32.

Figure 3A:
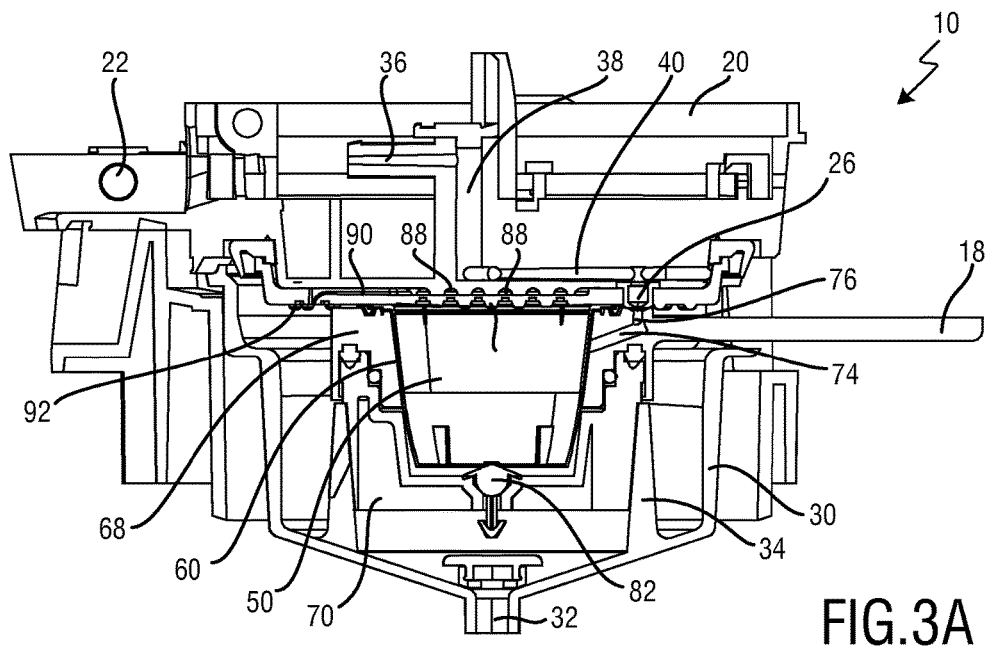
FIGS. 3A and 3B show a cross-section of the brewing unit, wherein the portable capsule holder is inserted into the brewing unit.
Figure 3B:
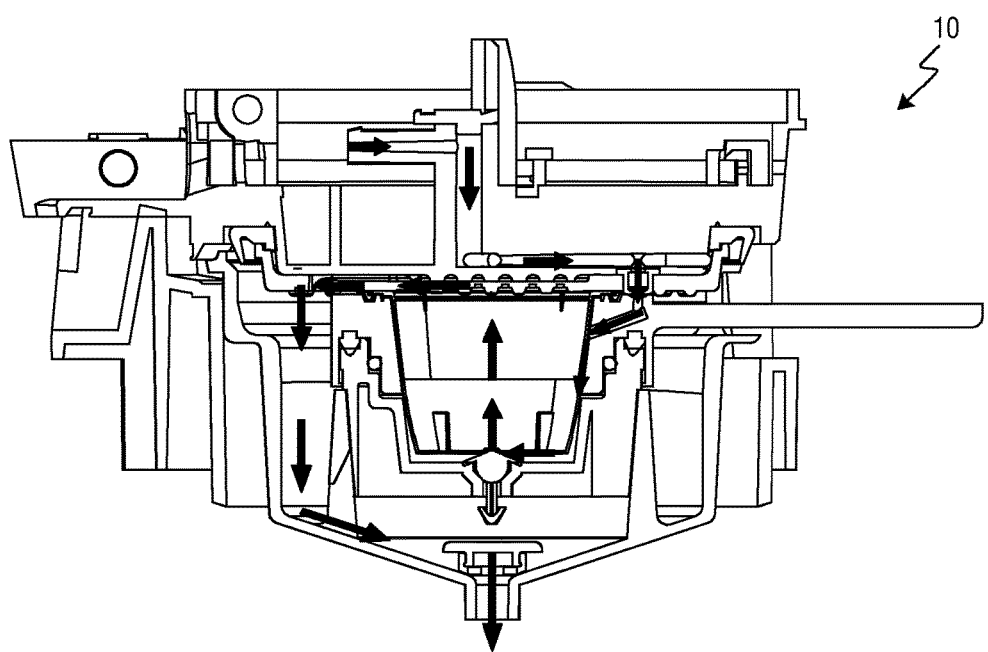

FIG. 3 shows the situation when the portable capsule holder 18 is inserted into the brewing unit 10 instead of the pad holder 16. FIGS. 3A and 3B again show the same cross-section. FIG. 3A illustrates the different parts by means of reference numerals and FIG. 3B schematically illustrates how the liquid flows through the brewing unit 10 and the portable capsule holder 18.

The portable capsule holder 18 is inserted into the same holder receptacle 34 as the portable pad holder 16 shown in FIG. 2. Even though the brewing unit 10 does not have to be modified for the portable capsule holder 18, the liquid flow through the brewing unit 10 is completely different than in the situation shown in FIG. 2. This allows to insert a capsule 50 into the capsule holder 18 with its upper side 52 on top and its rear side 54 facing downwards (see FIG. 5B), i.e. not upside-down. This makes it more intuitive to place the capsule 50 in the capsule holder 18 in a correct manner. Nevertheless, due to the especially designed channel system of the brewing unit 10 and the capsule holder 18, it is still possible to direct the liquid flow such that it enters the capsule at its rear side 54 and leaves it through its upper side. This will be explained in the following with reference to FIG. 5.

Figure 5A:
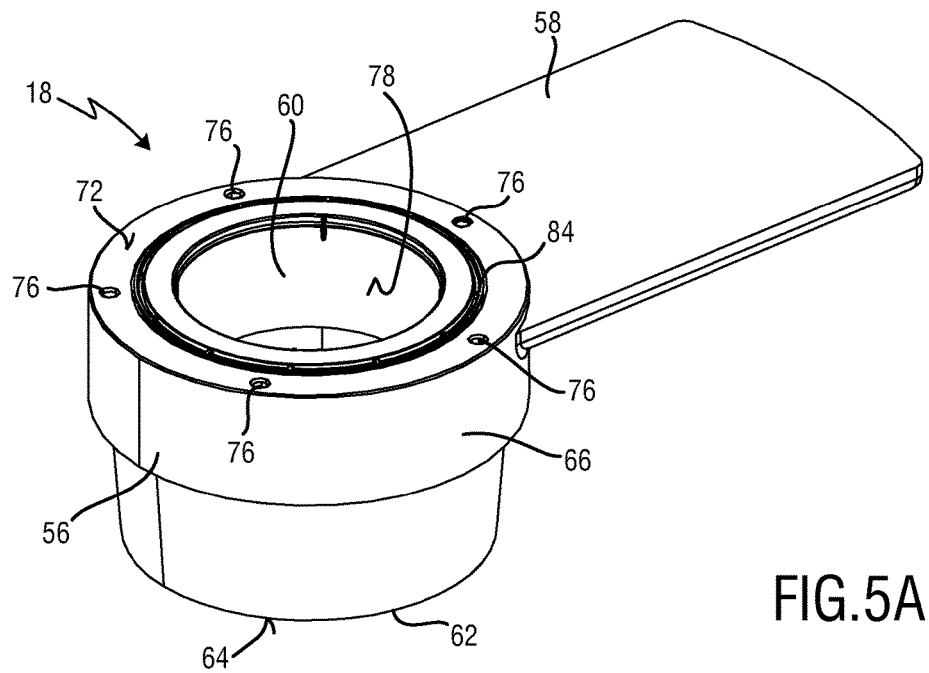
FIGS. 5A and 5B show a perspective view (FIG. 5A) and a cross-section (FIG. 5B) of the portable capsule holder according to an embodiment of the present invention.
Figure 5B:
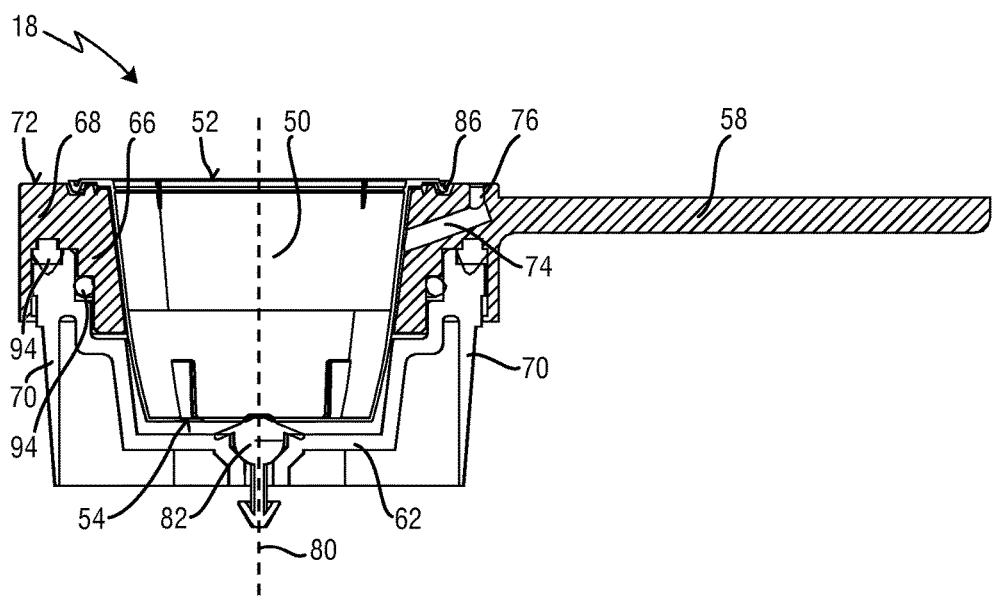

The portable capsule holder 18 comprises a main body 56 which is connected to a handle 58 (see FIGS. 5A and 5B). The main body 56 comprises a substantially cup-shaped capsule receptacle 60 that is configured to receive the capsule 50. The capsule receptacle 60 is defined by a bottom wall 62 that is arranged on a bottom side 64 of the base body 56, and by at least one sidewall 66 which surrounds the capsule receptacle 60 and runs transverse to the bottom wall 62. The bottom wall 62 and the sidewall 66 may be realized by one and the same integrated part. In the preferred embodiment shown in FIG. 5, the main body 56 is, however, divided in two separate parts 68, 70. The first body part 68 forms the upper part of the base body 56, and the second body part 70 forms the lower part of the base body 56. The first body part 68 comprises an upper part of the sidewall 66 of the capsule receptacle 60, and the second body part 70 comprises a lower part of the sidewall 66 as well as the bottom wall 62 of the capsule receptacle 60. The two body parts 68, 70 are preferably connected to each other via one or more spring elements (not shown). These spring elements push the two parts away from each other. The spring elements thus function as expansion elements. This has the main advantage that the upper side 72 of the base body 56 is by means of the spring force slightly pressed against the bottom side 24 of the lid 20 when the portable capsule holder 18 is inserted into the brewing unit 10 and the lid 20 is closed. This especially improves the sealing between the lid 20 and the capsule holder 18, since the base body 56 will be slightly compressed when the lid 20 is closed.

The portable capsule holder 18 may further comprise one or more sealing elements 94 that are arranged between the first body part 68 and the second body part 70 (see FIG. 5B). The one or more sealing elements 94 act as a kind of pressure compensator. As soon as liquid is injected into the capsule 50, the pressure within the portable capsule holder 18 will significantly increase. The two parts 68, 70 of the base body 56 of the capsule holder 18 will thus slightly move apart from each other. The mentioned sealing element 94 then compensates the movement of the first body part 68 relative to the second body part 70, such that the sealing is maintained.

The portable capsule holder 18 furthermore comprises at least one internal holder channel 74 which is integrated into the at least one side wall 66, preferably into the sidewall 66 of the first body part 68 (see FIG. 5B). The internal holder channel 74 starts at a holder liquid inlet 76, runs internally through the at least one sidewall 66, and ends in the inner face 78 of the capsule receptacle 60. The holder liquid inlet 76 is arranged at the upper side 72 of the base body 56 (see FIG. 5A).

The cross-section shown in FIG. 5B only shows one holder liquid inlet 76 and one internal holder channel 74. Even though a single internal holder channel 74 and a single holder liquid inlet 76 would be enough to guarantee the herein presented technical principle, the preferred embodiment comprises a plurality of internal holder channels 74 and respective holder liquid inlets 76 (see e.g. FIG. 5A). The plurality of internal holder channels 74 are preferably equally distributed (in a symmetric manner) over the base body 56. Each of the plurality of internal holder channels 74 is preferably equally distanced from a central longitudinal axis 80 of the capsule receptacle 60. The holder liquid inlets 76 are also equally distanced from the central longitudinal axis 80.

In the shown embodiment, the portable capsule holder 18 further comprises a valve 82. The valve 82 is connected to the bottom wall 62 of the base body 56. The valve 82 allows draining the portable capsule holder 18 after the brewing process when no pressure is applied.

Alternatively or additionally, the portable capsule holder 18 may also comprises a puncture element for puncturing the rear side 54 of the capsule 50, if needed. This puncture element could be arranged in the bottom wall 62 of the base body 56, close to or instead of the valve 82. Said puncture element is herein denoted as "second puncture element". The second puncture element may project from the inner face 78 of the capsule receptacle 18 and may be connected to the bottom wall 62. Still further, the portable capsule holder 18 comprises a flange receptacle 84 for receiving a flange 86 of the capsule 50 (see FIG. 5A). This flange receptacle 84 is recessed in the at least one sidewall 66 and arranged on the upper side 72 of the base body 56.

FIG. 3B illustrates how the liquid flows through the brewing unit 10, the capsule holder 18 and the capsule 50. The liquid enters the lid 20 via the liquid supply inlet 36, flows into the liquid distribution channel 38, gets distributed within the different liquid feeding channels 40 and leaves the lid 20 through the plurality of first liquid outlets 26. Insofar the liquid flows in the same manner through the lid 20 as if the pad holder 16 was inserted into the brewing unit 10 (compared to FIG. 2B). After that the liquid enters the capsule holder 18 through the plurality of holder liquid inlets 76. Each of the plurality of first liquid outlets 26 is configured to be connected to a respective one of the plurality of holder liquid inlets 76 when the portable capsule holder 18 is inserted into the hollow 14 of the brewing unit 10. From the holder liquid inlets 76 the water will further flow through the internal holder channel 74, and enter into the capsule receptacle 60. From there the liquid will flow through a small gap between the capsule 50 and the inner face 78 of the capsule receptacle 60 towards the rear side 54 of the capsule 50. The liquid will then enter the capsule 50 at its rear side 54 through an opening that is either pre-perforated or punched into the rear side 54 of the capsule 50 by means of the above-mentioned second puncture element. The liquid continues to flow through the capsule 50 from the bottom to the top and thereby extracts the beverage (e.g. coffee). The extracted hot beverage leaves the capsule 50 at its upper side 52 through at least one opening that is either pre-perforated or punched into the upper side 52 of the capsule 50 by means of the above-mentioned first puncture elements. After leaving the capsule 50 the liquid then re-enters the lid 20. This re-entering of the liquid into the lid 20 is only done when capsules are used with the capsule holder 18, but not when pads are used with the pad holder 16. The liquid, which then already comprises the extracted beverage, re-enters the lid 20 via the liquid inlet 88 that is arranged on the bottom side 24 of the lid 20. From there the extracted beverage flows through a liquid transport channel 90 that is integrated in the lid 20. The liquid transport channel 90 runs substantially parallel to the liquid feeding channels 40, but is arranged further below in the lid 20, i.e. closer to the bottom side 24 of the lid 20. The extracted beverage then leaves the lid 20 again through a liquid outlet 92, which is herein denoted as second liquid outlet 92. This second liquid outlet 92 preferably has a larger distance from the symmetry axis of the lid 20 then the first liquid outlets 26. The extracted hot beverage may thus enter the liquid collection bowl 30, flow around the portable capsule holder 18, and leave the brewing unit 10 via the liquid dispensing outlet 32.

The liquid flow through the brewing unit 10 might at first side seem to be complicated in case the portable capital holder 18 is inserted into the brewing unit 10. However, the presented channel system within the lid 20 and the portable capsule holder 18 guarantees an optimal flow behavior through the capsule 50. The liquid flows through the capsule 50 in a similar manner as a fountain. A further major advantage of the presented beverage machine is that it may be easily used with different types of pads and capsules, wherein the handling is easy and intuitive for the consumer.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A beverage machine, comprising:
   a brewing unit with a main body defining a hollow for receiving a portable capsule holder, and with a lid connected to the main body for opening and closing the hollow; and
   the portable capsule holder that is configured to receive a capsule which encapsulates an extractable food product,
   wherein the lid comprises a liquid feeding channel which runs through the lid and ends in a first liquid outlet arranged at a bottom side of the lid, wherein the lid further comprises a liquid transport channel which starts at a liquid inlet arranged at the bottom side of the lid, runs internally through the lid, and ends in a second liquid outlet arranged at the bottom side of the lid, and wherein the portable capsule holder comprises:
   a base body with a substantially cup-shaped capsule receptacle for receiving the capsule, wherein the capsule receptacle is defined by a bottom wall that is arranged on a bottom side of the base body and by at least one side wall which surrounds the capsule receptacle and runs transverse to the bottom wall, and wherein the capsule is insertable into the capsule receptacle through an opening which is arranged on an upper side of the base body opposite the bottom side of the base body; and
   at least one internal holder channel which is integrated into the at least one side wall, wherein the at least one internal holder channel starts at a holder liquid inlet arranged at the upper side of the base body, runs internally through the at least one side wall, and ends in an inner face of the capsule receptacle, and wherein the inner face faces the capsule when the capsule is inserted.

2. The beverage machine as claimed in claim 1, wherein the first liquid outlet is configured to be connected to the holder liquid inlet when the portable capsule holder is inserted into the hollow of the brewing unit.

3. The beverage machine as claimed in claim 1, wherein the liquid feeding channel and the liquid transport channel run substantially parallel to the bottom side of the lid.

4. The beverage machine as claimed in claim 1, wherein the main body of the brewing unit comprises a liquid collection bowl, and wherein the second liquid outlet opens into the liquid collection bowl when the portable capsule holder is inserted into the liquid collection bowl and the lid is closed.

5. The beverage machine as claimed in claim 1, wherein the lid further comprises a plurality of liquid feeding channels, and wherein each of the plurality of liquid feeding channels runs through the lid and ends in a separate first liquid outlet arranged at the bottom side of the lid.

6. The beverage machine as claimed in claim 5, wherein the plurality of liquid feeding channels start in a central area of the lid and run radially outward, and wherein the first liquid outlets are equally distanced from the central area.

7. The beverage machine as claimed in claim 1, wherein the lid further comprises a first puncture element for puncturing an upper side of the capsule, and wherein the first puncture element is arranged at the bottom side of the lid and connected to the liquid inlet.

8. The beverage machine as claimed in claim 1, wherein the portable capsule holder further comprises a plurality of internal holder channels, and wherein each internal holder channel is integrated into the at least one side wall, starts at the holder liquid inlet arranged at the upper side of the base body, runs internally through the at least one side wall, and ends in the inner face of the capsule receptacle.

9. The beverage machine as claimed in claim 8, wherein the plurality of internal holder channels are equally distanced from a central longitudinal axis of the capsule receptacle.

10. The beverage machine as claimed in claim 1, wherein the base body of the portable capsule holder comprises at least two separate body parts, a first body part and a second body part, that are moveable relative to each other, and wherein a sealing element is arranged between the first body part and the second body part.

11. The beverage machine as claimed in claim 1, wherein the at least one side wall of the portable capsule holder comprises a flange receptacle for receiving a flange of the capsule, and wherein the flange receptacle is recessed in the at least one side wall and arranged on the upper side of the base body.

12. The beverage machine as claimed in claim 1, wherein the portable capsule holder further comprises a valve which is connected to the bottom wall.

13. The beverage machine as claimed in claim 1, further comprising a portable pad holder that is configured to receive a soft pad which encapsulates an extractable food product, wherein the hollow is configured to selectively receive either the portable capsule holder or the portable pad holder.

14. The beverage machine as claimed in claim 1, wherein the liquid feeding channel and the liquid transport channel are horizontally arranged and are parallel to each other.

15. A brewing unit for a beverage machine, the brewing unit comprising:
   a main body defining a hollow for receiving a portable capsule holder and a lid connected to the main body for opening and closing the hollow,
   wherein the lid comprises a liquid feeding channel which runs through the lid and ends in a first liquid outlet arranged at a bottom side of the lid, wherein the lid further comprises a liquid transport channel which starts at a liquid inlet arranged at the bottom side of the lid, runs internally through the lid, and ends in a second liquid outlet arranged at the bottom side of the lid, and wherein the liquid feeding channel and the first liquid outlet are fluidically separate within the lid from the liquid inlet, the liquid transport channel, and the second liquid outlet.

16. A beverage machine, comprising:
   a brewing unit including a main body defining a hollow for receiving at least one of a portable capsule holder or a portable pad holder, and a lid connected to the main body for opening and closing the hollow,
   wherein the lid comprises a liquid feeding channel which runs through the lid and ends in a first liquid outlet arranged at a bottom side of the lid, wherein the lid further comprises a liquid transport channel which starts at a liquid inlet arranged at the bottom side of the lid, runs internally through the lid, and ends in a second liquid outlet arranged at the bottom side of the lid, and wherein the liquid feeding channel and the first liquid outlet are fluidically separate within the lid from the liquid inlet, the liquid transport channel, and the second liquid outlet.

17. The beverage machine as claimed in claim 16, comprising a portable capsule holder including:
   a base body with a substantially cup-shaped capsule receptacle for receiving a capsule that encapsulates an extractable food product, wherein the capsule receptacle is defined by a bottom wall that is arranged on a bottom side of the base body and by at least one side wall which surrounds the capsule receptacle and runs transverse to the bottom wall, and wherein the capsule is insertable into the capsule receptacle through an opening which is arranged on an upper side of the base body opposite the bottom side; and
   at least one internal holder channel which is integrated into the at least one side wall, wherein the at least one internal holder channel starts at a holder liquid inlet arranged at the upper side of the base body, runs internally through the at least one side wall, and ends in an inner face of the capsule receptacle, and wherein the inner face faces the capsule when the capsule is inserted.

18. The beverage machine as claimed in claim 16, wherein the portable pad holder is configured to receive a soft pad which encapsulates an extractable food product.

19. The beverage machine as claimed in claim 16, wherein the liquid feeding channel and the liquid transport channel are horizontally arranged and are parallel to each other.

\* \* \* \* \*